March 10, 1964   W. E. BRAINARD ETAL   3,124,017
AUTOMATIC MULTIPLE SPINDLE DRILLING MACHINE
Filed Oct. 31, 1960                                      6 Sheets-Sheet 1

INVENTORS
Wallace E. Brainard
BY Werner K. Behrendt
William C. Gleisner Jr.
Attorney March 10, 1964   W. E. BRAINARD ETAL   3,124,017
AUTOMATIC MULTIPLE SPINDLE DRILLING MACHINE
Filed Oct. 31, 1960   6 Sheets-Sheet 4

INVENTORS
Wallace E. Brainard
BY Werner K. Behrendt
William C. Gleisner Jr.
Attorney March 10, 1964 W. E. BRAINARD ETAL 3,124,017
AUTOMATIC MULTIPLE SPINDLE DRILLING MACHINE
Filed Oct. 31, 1960 6 Sheets-Sheet 5

INVENTORS
Wallace E. Brainard
BY Werner K. Behrendt
William C. Gleisner Jr.
Attorney March 10, 1964 W. E. BRAINARD ETAL 3,124,017
AUTOMATIC MULTIPLE SPINDLE DRILLING MACHINE
Filed Oct. 31, 1960 6 Sheets-Sheet 6

INVENTORS
Wallace E. Brainard
BY Werner K. Behrendt
William C. Gleisner Jr.
Attorney United States Patent Office 3,124,017
Patented Mar. 10, 1964

3,124,017
AUTOMATIC MULTIPLE SPINDLE DRILLING MACHINE
Wallace E. Brainard, Milwaukee, and Werner K. Behrendt, Wauwatosa, Wis., assignors to Kearney & Trecker Corporation, West Allis, Wis., a corporation of Wisconsin
Filed Oct. 31, 1960, Ser. No. 66,321
7 Claims. (Cl. 77—24)

This invention relates generally to multiple spindle drilling machines, and more particularly to a multiple spindle drilling machine incorporating automatic spindle holding clamps.

A general object of this invention is to provide a greatly improved multiple spindle drilling machine.

Another object of the invention is to provide a multiple spindle drilling machine having a plurality of spindles carried by bodily movable spindle holders, the latter being adapted to be automatically clamped in a manner to retain the spindles in preselected positions for performing a multiple drilling operation.

Another object of the invention is to provide a multiple spindle drilling machine having improved novel spindle holders adapted to respectively support a tool spindle for bodily movement to preselected position.

A further object of the invention is to provide improved automatically releasable clamping means for the spindle support holders of a plurality of spindles in a multiple spindle drilling machine.

A further object of the invention is to provide novel dual clamping means for a plurality of spindle holders of a multiple spindle drilling machine including sequentially operative separate clamps respectively associated with each spindle holder, and a collective bridge clamp operatively associated with a plurality of the spindle holders in a manner that each holder is clamped at separate spaced apart positions.

A still further object of the invention is to provide a tool change mechanism for interchanging tools between a storage magazine and a rotatable spindle, and including means for selectively releasing and reclamping a tool clamp associated with the tool spindle.

A still further object of the invention is to provide selectively disengageable clamping means for the spindle holders of a multiple spindle drilling machine for facilitating the positioning of a plurality of drill spindles for drilling a preselected pattern of holes upon a workpiece.

According to this invention, a multiple spindle drilling machine is provided with a supporting base having on its upper surface spaced apart horizontally disposed ways adapted to slidably support a multiple spindle drilling head for operating movement in a horizontal plane. In order that the spindles may be preset laterally with respect to their horizontal axes of movement, each of the multiple spindles is rotatably journalled toward the inner end of separate spindle supporting arms that are releasably clamped to the supporting head. For retaining the tool spindles in preselected positions in accordance with the requirements of a particular pattern of holes, power actuated clamps are respectively connected to fixedly clamp each of the spindle holders to the supporting spindle heads.

The foregoing and other objects of the invention which will become more fully apparent from the following description of the improved automatic multiple spindle drilling machine may be achieved by the embodying mechanisms described herein in connection with the accompanying drawings, in which.

Figure 1:
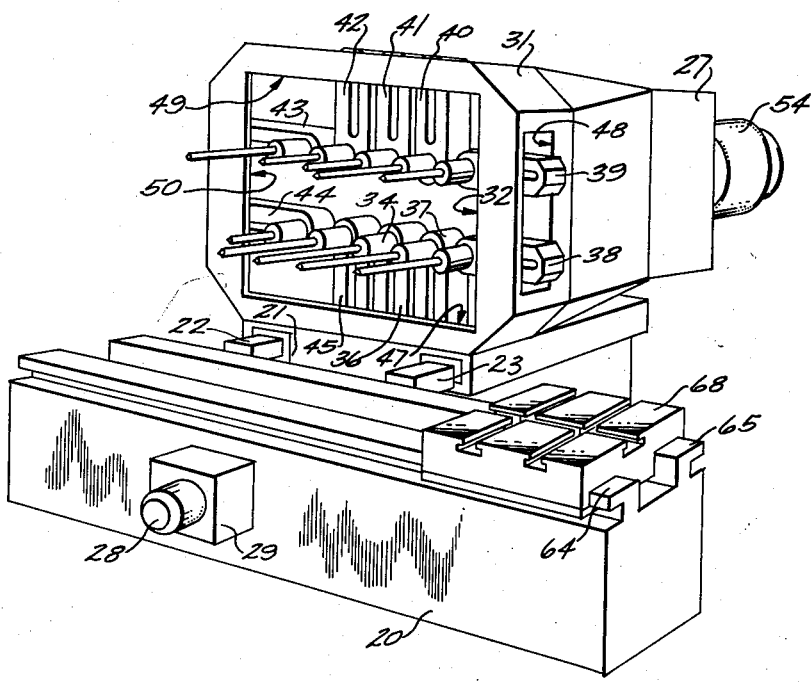
FIGURE 1 is a schematic perspective view of a multiple spindle drilling machine including an automatically operative spindle holder clamping mechanism embodying the present invention.
Figure 2:
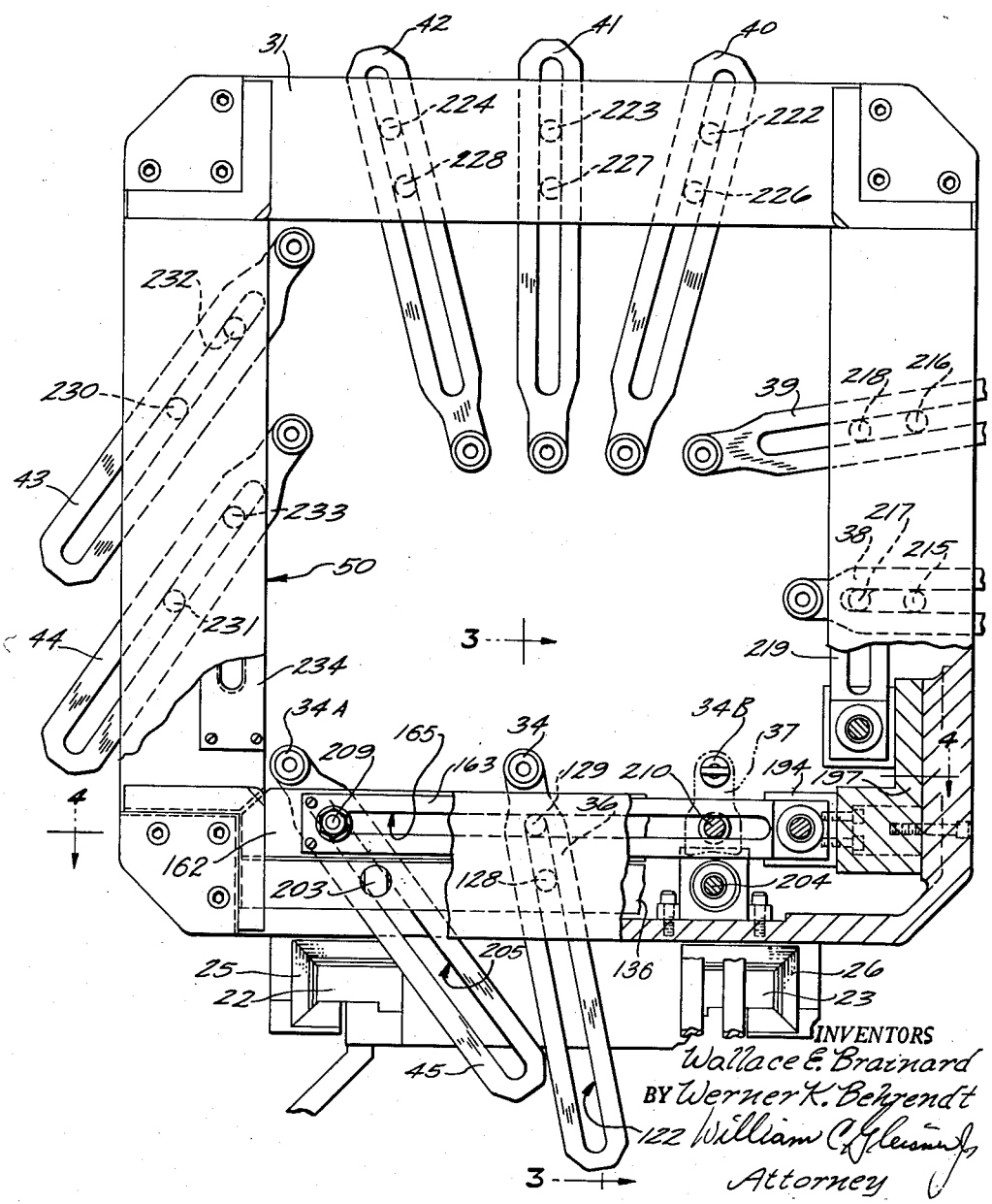
FIG. 2 is an enlarged view, partly in front elevation and partly in transverse vertical section, taken through the forward spindle supporting portion of the multiple spindle drilling head.

Referring to the drawings and particularly to FIG. 1, the multiple spindle drilling machine embodying the principles of this invention comprises a base or frame 20 and a transversely extending base 21, the latter being provided on its upper surface with spaced apart, horizontally disposed way surfaces 22 and 23. The way surfaces 22, 23 are slidably engaged by complementary ways 25, 26 integrally formed with the underside of a bodily movable spindle head 27, as shown in FIGS. 1 and 2. A motor 28 secured to a front wall of the longitudinally extending base 20 is operatively connected to drive a variable feed transmission 29, the latter being connected in well known manner to actuate a screw and nut translating mechanism (not shown) to effect the required horizontal movement of the spindle carrying head 27 along the base 21.

At its forward enlarged end, the spindle head 27 is provided with a rectangular structure 31 defining a generally rectangular central opening 32 that limits the lateral range of adjustment of presettable tool spindles adjustably carried by the head structure 31. As shown in FIG. 1, a plurality of tool spindles, such as the spindle 34, are respectively journalled at the inner ends of laterally extending spindle holders or support arms 36 to 45, inclusive. The three lower spindle holders 45, 36 and 37 extend laterally downwardly through a slotted opening 47 presented in the lower face of the head structure 31. In a similar manner, the spindle support holders 38 and 39 extend outwardly through an enlarged, vertically extending slot 48 formed in the right face of the head structure 31. The upper face of the head structure 31 is provided with another longitudinally extending opening 49 adapted to fixedly retain the spindle holders 40, 41 and 42 in preselected positions. The remaining two spindle support holders 43 and 44 are retained in releasable clamped engagement within an opening 50 presented in the left face of the head structure 31 as viewed in FIG. 1.

As will hereinafter be more fully explained, there are provided power operable means for selectively releasing the spindle supporting holders 36 to 45 respectively, from clamped engagement with the supporting head structure 31. After the spindle holders have been unclamped, the tool spindles, such as the spindle 34, respectively carried thereby may be repositioned within the rectangular opening 32 for drilling a different predetermined pattern of holes. As soon as the spindles 34 have been repositioned laterally with respect to the opening 32, automatic clamping means are reactuated to positively clamp the spindle holders 36 to 45, inclusive, into fixed laterally adjusted positions.

Figure 3:
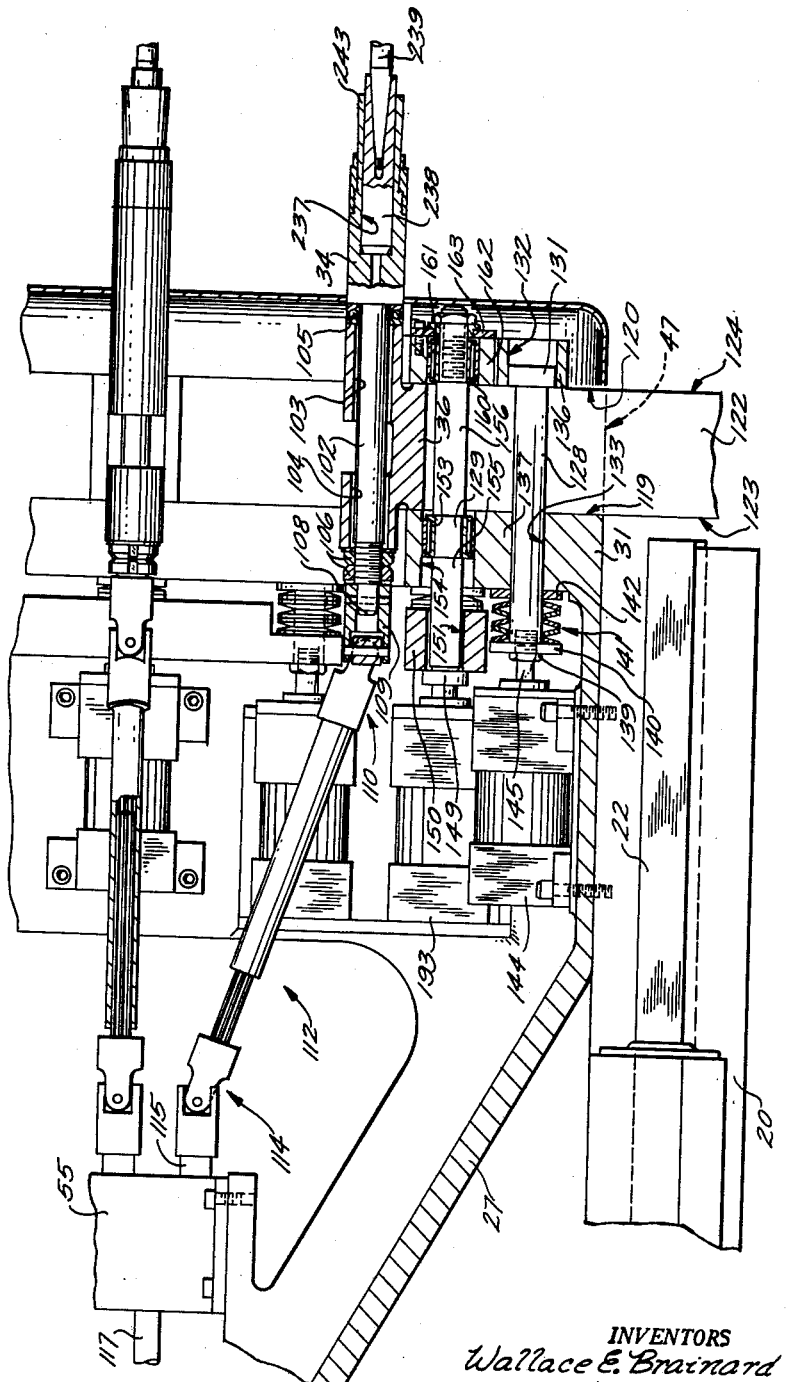
FIG. 3 is a view in vertical section through a portion of the multiple spindle drilling head, taken generally along the lines 3—3 in FIG. 2, and showing the operative interconnection of the spindle holder clamps.

Inasmuch as each of the tool spindles 34 is rotatable about an axis parallel to the axis of movement of the head 27, it will be readily apparent that actuation of the driving feed motor 28 is operative to effect corresponding bodily movement of the tool spindles for effecting a multiple drilling operation. As shown in FIGS. 1 and 3, a drive motor 54 is operatively connected via a motor shaft 117 to drive a variable speed transmission 55, the latter in turn being connected to effect simultaneous rotatable movement of the tool spindles 34. The speed transmission 55 may be of any well known type and is adjusted to drive the tool spindles at a rate appropriate for the largest diameter drill carried by one of the spindles.

As represented in FIG. 1, the tool spindles 34 have all been moved laterally to selected positions and the respective spindle holders 36 to 45, inclusive, urged into clamping engagement with the spindle head structure 31 for drilling a predetermined pattern of holes. The base 20 is provided with longitudinal ways 64, 65 adapted to slidably carry a work supporting pallet 68. The usual power drive means (not shown) may be provided to advance the pallet 68 from an operating position in proximity to the spindle head to a parked position shown in FIG. 1.

Inasmuch as the method of supporting each of the plurality of tool spindles for preselected lateral adjustment is identical, only one of the spindles and its associated spindle holder will be described in detail. As shown in FIGS. 2 and 3, the tool spindle 34 is rotatably journalled toward the inner end of the spindle supporting arm 36. The spindle 34 is provided with an enlarged forward flanged end portion and a rearwardly extending shank 102 of reduced diameter rotatably supported by sleeve bearings 103 and 104 respectively carried within concentrically aligned bored openings formed in spaced apart portions of the arm 36. The flanged forward end of the spindle 34 directly engages the outer race of a thrust bearing 105, the opposite race of which engages a side face of the support arm 36. At its opposite end, the spindle shank 102 is threaded to receive lock nuts 106 which are operative to constrain the spindle 34 against axial movement within the sleeve bearings 103, 104. The spindle shank 102 is likewise provided with a circular end portion 108 of reduced diameter pinned directly to a tubular connector 109. The tubular connector 109, in turn, is secured to one end of a universal joint 110, the opposite end being pinned directly to one end of a slidably extensible telescoping splined shaft 112.

At its opposite end, the telescoping splined shaft 112 is operatively connected via another universal joint 114 to a rotatably driven output shaft 115 journalled at its inner end to rotate in the variable speed transmission 55. The variable speed transmission 55, in turn, is connected to receive driving power via a motor shaft 117 driven by the spindle speed motor 54, FIG. 1. It will be readily apparent that the transmission 55 is operatively connected to rotate the drill spindle 34 for performing a drilling operation, irrespective of the laterally adjusted position of the spindle 34 within the hollow head structure 31. As the tool spindle 34 is laterally moved to different positions of adjustment within the hollow opening provided in the head structure 31, the telescoping splined shaft 112 is slidably extensible in well known manner to maintain the rotative driving connection between the transmission output shaft 115 and the tool spindle 34. The driving arrangement for the remaining nine spindles carried by the multiple spindle drilling head is identical to that described for the spindle 34 carried by a supporting arm 36. In each case, there is provided a separate extensible telescoping splined shaft connection between the respective remaining spindles and transmission output shafts driven by the variable speed transmission 55. Whenever a drilling operation is to be performed, as hereinbefore explained, the variable speed transmission 55 is adjusted in well known manner to provide an output speed suitable for the largest diameter drill carried by one or another of the tool spindles.

As shown in FIGS. 2 and 3, the spindle suppporting arm or holder 36 extends laterally through the enlarged, slotted opening 47 defined generally by vertically disposed surfaces 119, 120 formed in the head structure 31. As further shown in FIGS. 2 and 3, the spindle holder 36 is provided with a slotted opening 122 extending lengthwise of the holder and perpendicular to faces 123, 124 presented thereby.

The inner head surface 119 is in perpendicular relationship to the horizontal ways 22 and 23 which guide the spindle head 27 for horizontal drilling movement. Likewise, the face 123 of the spindle support arm 36 is in exact perpendicular relationship to the axis of rotation of the tool spindle 34. Whenever the spindle 34 is clamped to the spindle head structure 31, the spindle holder surface 123 is urged into abutting clamping engagement with the spindle surface 119. Thus, the clamping engagement between surfaces 123 and 119 respectively presented by the spindle holder 36 and the head structure 31 maintain the tool spindle 34 in parallelism with the transverse, horizontal plane of spindle head movement during a drilling operation.

The lengthwise slot 122 formed in the spindle holder 36 engages the circular central portions of two pivot members 128 and 129 carried in adjustably spaced apart relationship by the head structure 31 in a manner to guide the spindle support arm 36 during positioning movement of the spindle 34.

The circular central portion of the pivot clamp element 128 is integrally formed with an enlarged flanged end 131 that is guidably constrained for movement within a circular bored opening 132 formed in a portion of the head structure 31. Another circular bored opening 133 formed in the head structure 31 at the opposite side of the spindle support arm 36 engages the circular portion of the pivot clamp element 128, and coacts with the enlarged bored opening 132 in a manner to guide the pivot clamp element 128 for axial movement in parallelism with the direction of head movement.

The concentrically aligned bored openings 132, 133 are respectively formed in spaced apart transverse webs 136, 137 integrally formed with the spindle supporting head structure 31. Thus, the circular central portion of the pivot clamp element 128 engages the lengthwise slot 122 formed in the spindle support 36 to constitute a fixed pivot axis during lateral positioning movement of the spindle 34. As represented in FIG. 3, the pivot element is urged inwardly in a manner that the flanged end 131 thereof engages the support arm surface 124 to urge the surface 123 into clamping engagement with the head surface 119. To this end, a cap screw 139 is threadedly engaged in one end of the pivot or guide element 128 to maintain a thrust washer 140 in engagement with one end of a circular Belleville spring 141. The opposite end of the spring 141 engages another thrust washer 142 abutting a side face of the transverse web 137 formed in the head structure 31. Spaced inwardly relative to the inner end of the pivot clamp element 128, there is provided a single pivot clamp element release cylinder 144 which is secured to an inner wall of the head structure 31. The release cylinder 144 is provided with an axially movable piston rod 145 disposed in axially concentric relationship to the head of the cap screw 139 secured to one end of the pivot clamp element 128.

Assuming the axially movable pivot clamp element 128 is released, the cylinder 144 is hydraulically energized to urge the piston rod 145 in a direction to effect axial movement of the pivot clamp element 128 thereby compressing the Belleville spring 141 to released position. As this occurs, the spring 141 is compressed between the thrust washers 140, 142 by operation of the piston rod 145, permitting axial movement of the flanged end 131 out of engagement with the surface 124 presented by the spindle holder 36. Consequently, the opposite face 123 of the spindle support arm 36 is released from tight clamping engagement with the vertical surface 119 presented by the transverse spindle head web 137. The arrangement is such, however, that even though both pivot elements 128 and 129 are released, frictional engagement between the surfaces 123, 124 presented by the spindle support arm 36 with respectively associated head surfaces 119, 120 is sufficient to preclude accidental displacement of the tool spindle 34. During this condition, i.e., with the elements 128 and 129 released, the spindle support arm 36 may be manually moved to effect the required lateral adjustment of the tool spindle 34 with respect to the spindle supporting head 31.

Figure 4:
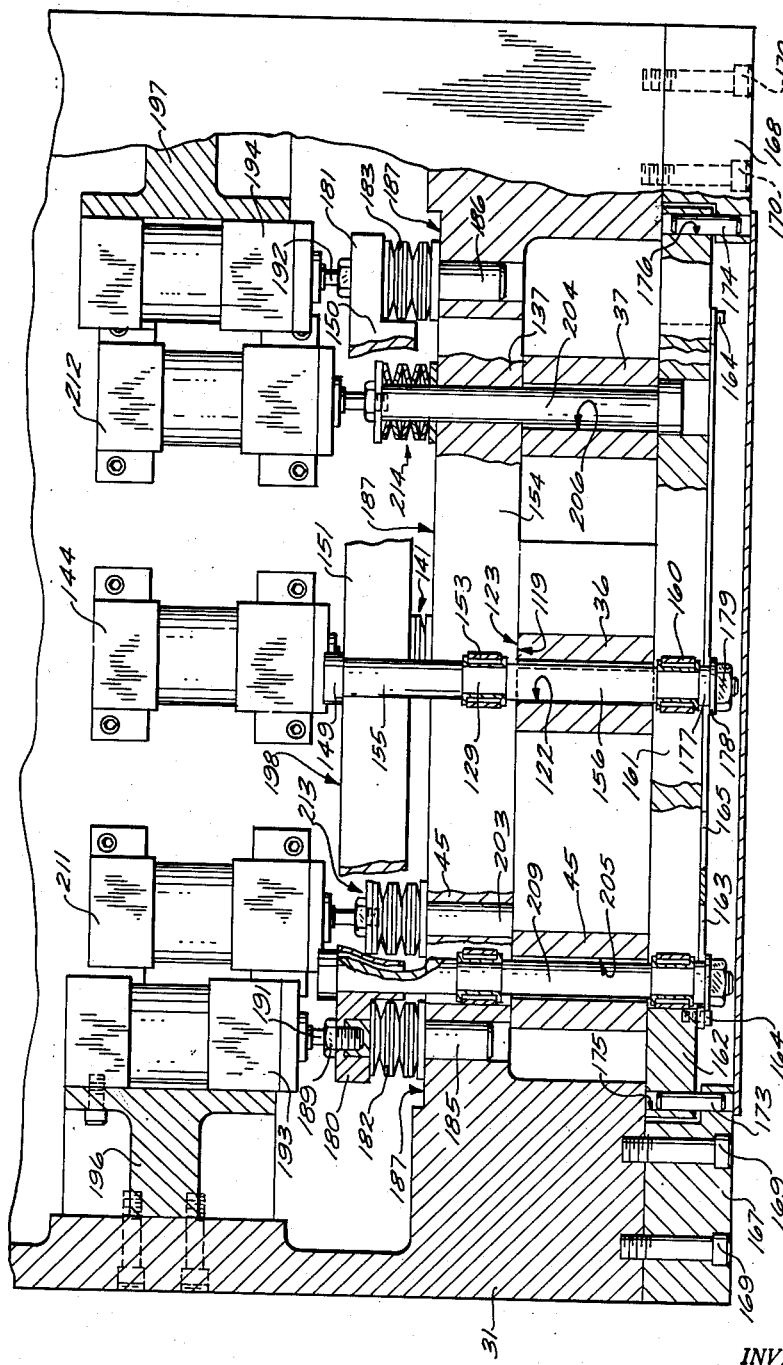
FIG. 4 is a view in horizontal section through a portion of the multiple spindle drilling head, taken generally along the lines 4—4 in FIG. 2, and illustrating a bridge clamp for a plurality of spindle holders.

The adjustably movable pivot element 129 comprises essentially a bolt having an enlarged head 149 constituting a flanged element engaging a side face of a slotted bridge clamp operator member 150. The bridge clamp operator member 150, as shown in FIGS. 3 and 4, is provided with a slotted opening 151 permitting laterally slidable movement of the element 129 therein. An antifriction bearing 153 encircling the central portion of the adjustably movable pivot element 129 is provided with an outer race guidably constrained for lateral movement within a slotted opening 154 presented in the transverse web 137 of the head structure 31. The bearing 153 is retained in proper axial position by means of a spacer sleeve 155 encircling one portion of the bolt 129 and another spacer sleeve 156 encircling the central portion of the pivot element 129. It will be readily apparent that the bolt 129 does not directly engage the lengthwise slotted opening 122 presented by the spindle support arm 36. Instead, the bolt 129 is of reduced diameter, and carries the spacer sleeve 156 having an outer diameter engaging the slot 122, and corresponding in diameter to the diameter of the pivot element 128.

Another antifriction bearing 160 is retained in encircling relationship to the pivot element 129 abutting the end face of the spacer sleeve 156. As shown in FIGS. 3 and 4, the outer race of the bearing 160 engages an enlarged slot 161 formed in a floating bridge clamp element 162. A slotted way 163 is secured to a side face of the floating clamp member 162 by means of cap screws 164; a slot 165 in the way strip 163 parallels the slot 161. The floating clamp element 162 is guided for movement toward or away from the spindle support arm 36 by means of brackets 167, 168 fixedly secured to the head structure 31 by means of cap screws 169, 170. Guide pins 173, 174 are fixedly secured to flanged edges of the brackets 167 and 168 respectively in a manner to engage bored openings 175, 176 formed in the ends of the floating clamp element 162. By means of this arrangement, the floating clamp element 162 is guided for movement toward or away from the spindle support holder 36 by means of the guide pins 173 and 174. It will be apparent that the holes 175, 176 are slightly enlarged to provide the proper guiding slidable engagement with the cooperating stationary guide pins 173, 174.

To retain the bearing 160 in guiding engagement with the slot 161, another spacer sleeve 177, thrust washer 178, and nut 179 are secured to the end of the bolt 129 as shown in FIG. 4. The slot 165 formed in the way strip member 163 is slightly narrower in width than the slot 161 presented by the floating clamp member 162. Thus, the thrust clamp washer 178 slidably engages the side face of the way 163 on either side of the slot 165 formed therein.

It will be noted that the slot 122 formed in the bodily movable spindle support arm 36 is retained in generally perpendicular relationship to the horizontal slot 154 formed in the transverse spindle head web 137, as well as the horizontal slot 161 formed in the floating bridge clamp member 162, as viewed in FIGS. 3 and 4. Likewise, the guiding slots 154 and 161 respectively formed in the web 137 and floating clamp 162 are disposed in parallelism to the slot 151 formed in the bridge clamp operator 150, as well as the slot 165 presented in the way 163.

With reference to FIG. 3, as hereinbefore explained, the pivot clamp element 128 is operative to urge a side face 123 of the spindle support arm 36 into frictional engagement with a side face 119 presented by the transverse spindle head web 137 by operation of the Belleville spring 141. In a similar manner, the bolt 129 is operative to urge the side face 123 of the spindle support arm 36 into clamping frictional engagement with the side face 119 of the transverse spindle head web 137. Axial inward movement of the laterally adjustable pivot element 129 is effected by resiliently urged movement of the bridge clamp operator 150, the latter having flanged ends 180 and 181 respectively engaged by spaced apart Belleville springs 182 and 183.

As represented in FIG. 4, Belleville springs 182, 183 for actuating the bridge clamp operator 150 are disposed in encircling relationship to guide rods 185, 186 carried within bored openings formed in the transverse head web 137. The Belleville spring 182 is normally disposed to exert outward clamping pressure between a side face 187 of the web 137 and the end 180 of the bridge clamp operator 150. In a similar manner, the Belleville spring 183 is disposed to exert clamping pressure between the side face 187 of the web 137 and the end 181 of the bridge clamp operator 150. Adjusting cap screws 189, 190 threaded in the ends 180, 181 of bridge clamp operator 150 are provided with heads adapted to constitute abutment surfaces for axially movable piston rods 191, 192 respectively associated with hydraulic cylinders 193, 194.

As shown in FIG. 4, the cylinders 193, 194 are fixedly secured to support brackets 196, 197 which, in turn, are secured to the inner side faces of the head structure 31. The arrangement is such that the piston rods 191, 192 respectively carried by the pistons are in axially concentric relationship with the abutment cap screws 189, 190 threadedly secured to the opposite ends of the relatively movable bridge clamp operator 150. Simultaneous actuation of the spaced apart cylinders 193, 194 effects corresponding axial movement of piston rods 191, 192 to urge the bridge clamp operator 150 to released position in which both Belleville springs 182, 183 are compressed between the flanged ends of the bridge clamp and the abutment washers adjacent the side face 187 of the head casting web 137.

As represented in FIG. 4, however, the hydraulic cylinders 193, 194 are deactivated in a manner to retract the piston rods 191, 192 permitting resiliently expansible movement of the Belleville springs 182, 183 into clamped position. With this condition existing, a side face 198 of the slotted bridge clamp operator 150 engages the flanged head 149 of the bolt element 129 to in turn effect axial movement of the element 129 for urging the thrust washer 178 into engagement with the slotted way 163 secured to the floating clamp member 162. As this occurs, the floating clamp member 162, in turn, is urged into engagement with the spindle support arm 36, the side face 123 of the latter, thus being urged into tight frictional clamping engagement with the locating face 119 of the slotted guide web 137. Whenever the bridge clamp operator 150 is actuated into clamped position by springs 182, 183 the support arm 36 is brought into engagement with the web 137, irrespective of the laterally adjusted position of the bolt 129 relative to the bridge clamp slot 151, the web slot 154 and the slots 161 and 165.

Whenever the single spring 141 associated with the laterally stationary pivot clamp 128 and the springs 182, 183 associated with the bridge clamp operator 150 that is associated with the laterally adjustable bolt 129 are activated axially to released position, it will be readily apparent that the tool spindle 34 may be laterally positioned within the rectangular opening 32 presented by the spindle head structure 31. During lateral adjustment of the spindle 34, the arm 36 may be moved bodily as determined by the length of the slot 122 formed in the support arm 36. In the event the spindle 34 is moved upwardly, as viewed in FIG. 2, as limited by the stationary pivot clamp 128 and the end of the slot 122, the spindle 34 can then be moved laterally in an arcuate path with the pivot clamp 128 constituting the axis of arcuate movement. As this occurs, it will likewise be apparent that the laterally adjustable bolt element 129 will be bodily displaced relative to the slot 165 formed in the slotted way 163. In all cases, the stationary pivot clamp 128 engages the slot 122 formed in the support arm 36 to guide the support arm for either rectilinear or arcuate lateral movement. In all cases, likewise, the laterally adjustable element 129 is slidably engaged both by the slot 122 in the support arm 36, as well as the guide slots 154 and 161, FIG. 4, respectively formed in the transverse web 137 and the floating clamp element 162. As represented in FIGS. 2 and 4, separate stationary pivot clamps are respectively associated with the laterally movable support arms 45, 36, and 37. The bridge clamp operator 150 constitutes a common clamp actuating member operative to simultaneously actuate laterally adjustable pivot bolt elements respectively associated with the support arms 45, 36 and 37. In other words, each of the spindle support arms 45 and 37 is provided with a stationary pivot clamp and a spaced apart laterally adjustable pivot bolt, such as the stationary pivot bolt 128 and the adjustable pivot clamp 129 associated with the spindle support arm 36. The spaced apart pivot clamp respectively associated with support arms 45 and 37 are identical in structure and mode of operation to the pivot clamps 128 and pivot bolt 129 described in connection with the spindle support arm 36. It is not deemed necessary, therefore, to describe in detail the spaced apart clamps associated with each of the spindle support arms 45 and 37.

As indicated in FIGS. 2 and 4, stationary pivot clamps 203 and 204 are respectively disposed to engage slots 205 and 206 formed in spindle support arms 45 and 37. Likewise, laterally adjustable pivot clamp elements 209 and 210 are disposed to engage the slots 205 and 206 formed in spindle support arms 45 and 37. As hereinbefore explained with reference to the laterally adjustable pivot element 129 associated with support arm 36, the adjustable pivot bolt elements 209 and 210 are likewise disposed to be actuated by the common bridge clamp operator 150. Thus, simultaneous activation of cylinders 193, 194 in FIG. 4 operate to simultaneously release the adjustable pivot bolt elements 209, 129 and 210. Separate hydraulic cylinders 211 and 212 are secured within the head structure 31 in axial relationship with the axially movable pivot clamp elements 203 and 204. Thus, selective individual activation of cylinders 211, 212 operate to compress concentrically disposed stacks of Belleville springs 213, 214 for axially moving the associated pivot clamp elements 203, 204 to disengaged released position.

As hereinbefore explained, the support arms 45 and 37 are disposed in like manner to rotatably support tool spindles identical to the spindle 34 carried by arm 36, these spindles being driven by a separate telescoping drive shaft connected in well known manner to be rotated by separate output shafts driven by the variable speed transmission represented in FIG. 3. Because of the similarity in construction and driving means, therefore, the spindles respectively carried at the inner ends of support arms 45 and 37 are identified as 34A and 34B. It is noted that the axially movable, pivot clamps 203, 128 and 204 are retained in fixedly spaced relationship along the inner side wall of the head structure 31 to constitute stationary pivot axes for the respectively associated spindle support arms 45, 36 and 37. Separate, individually operable release cylinders 211, 144 and 212 are associated with each of the stationary pivot clamps 203, 128 and 204. The laterally adjustable bolt elements 209, 129, and 210 are movable as may be required along the slot 165 presented by the way strip 163 to positions conforming to the laterally selected adjusted positions of the tool spindles 34A, 34 and 34B. Cylinders 193, 194 are simultaneously operative to urge the single bridge clamp operator 150 to released position whenever the spindle support arms 45, 36 and 37 are to be adjusted.

The arrangement for effecting automatic clamping as well as automatic unclamping of the spindle support arms 45, 36 and 37 is identical for the remaining spindle support arms 38 to 44, inclusive. Therefore, it is not deemed necessary to describe in detail the remaining clamping means for the other laterally positionable drill spindles.

As shown in FIG. 2, the spindle support arms 38, 39 are respectively provided with stationary, separately actuatable pivot clamp elements 215, 216; the arms 38, 39 are likewise provided with spaced apart, laterally adjustable pivot bolt elements 217, 218 which are individually movable relative to a guiding slot formed in a way strip 219. The way 219, in turn, is secured to a floating bridge clamp member (not shown) that is associated with a common bridge clamp operator (not shown) operative to effect simultaneous clamping operation of the laterally adjustable pivot bolt elements 217, 218.

In a similar manner, spindle support arms 40, 41 and 42 are respectively associated with stationary pivot clamp elements 222, 223 and 224; as well as laterally adjustable pivot bolt elements 226, 227 and 228 respectively actuated by a common bridge clamp operator (not shown). Further, the laterally positionable and separately extensible spindle support arms 43, 44 are provided with stationary pivot clamp elements 230, 231 and laterally adjustable pivot bolt elements 232, 233; the adjustable bolt elements being operatively actuated by a common bridge clamp operator (not shown) associated with a cooperating floating bridge clamp member (not shown) and a way strip 234 shown in FIG. 2.

Figure 5:
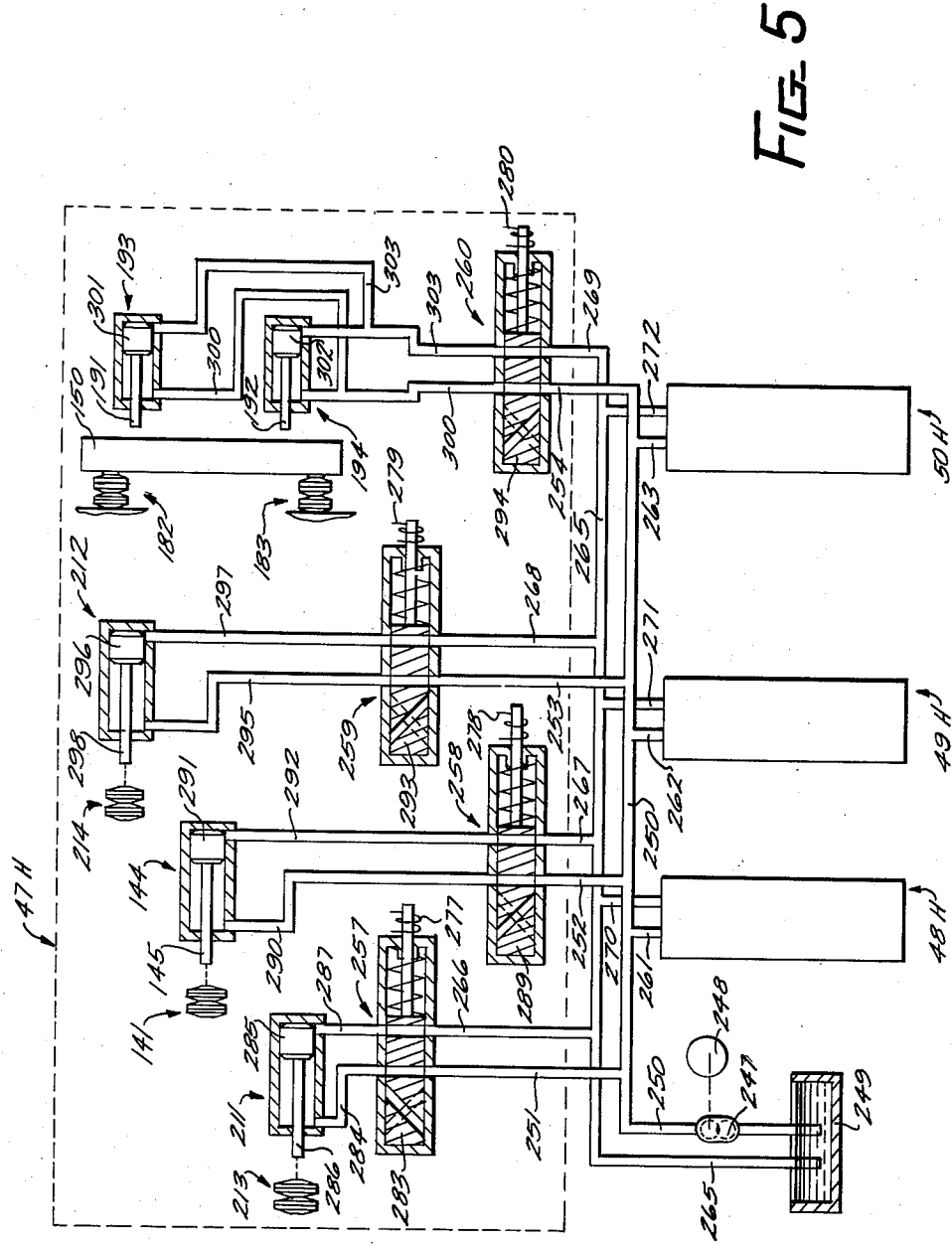
FIG. 5 is a schematic view of a hydraulic circuit for controlling the machine; and, FIG. 6 is a schematic view of an electrical control circuit.
Figure 6:
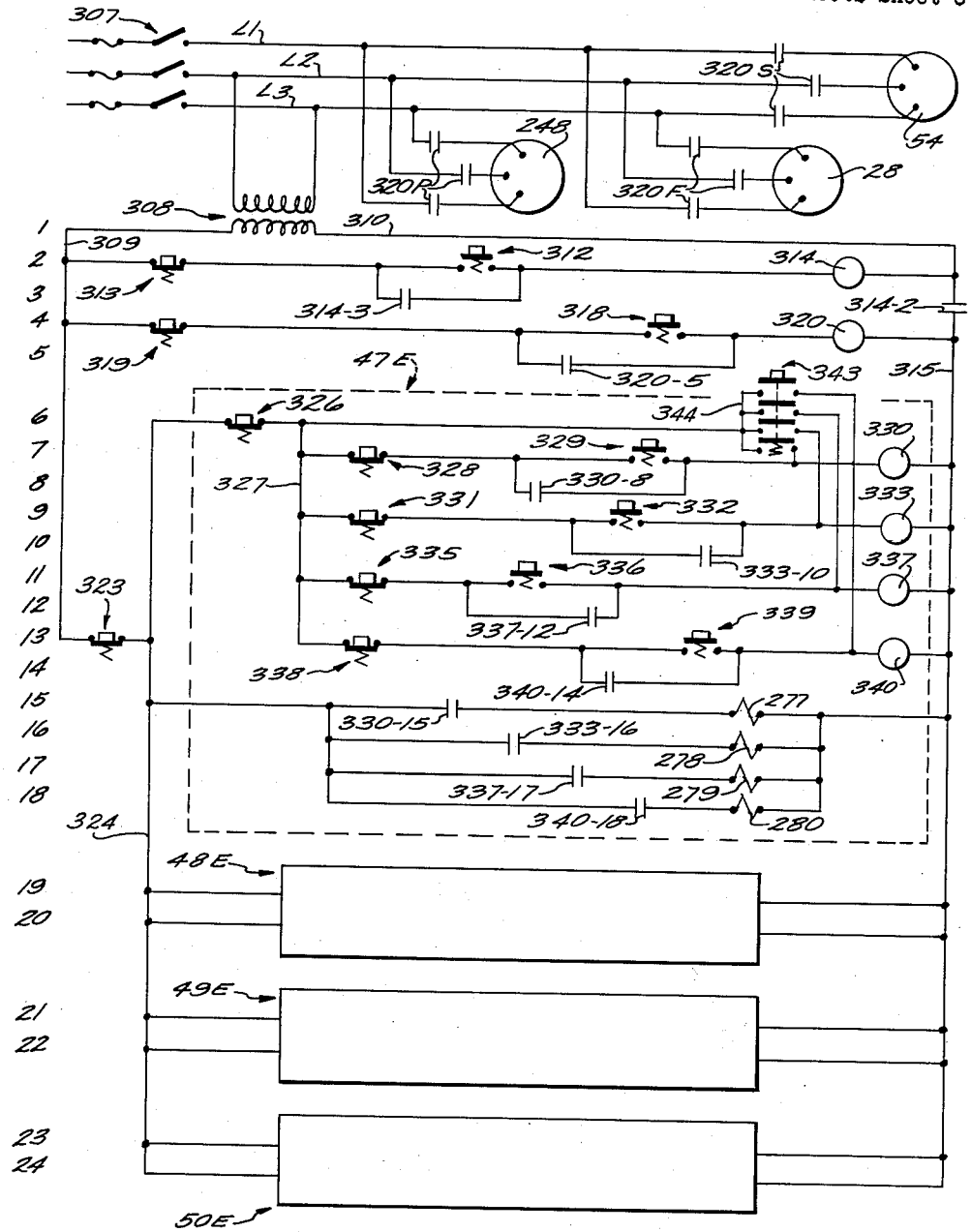

For selectively disengaging one or another of the various spindle holder clamps, there is provided a hydraulic control circuit, schematically illustrated in FIG. 5, that is operative in response to an electrical control circuit schematically represented in FIG. 6. As hereinbefore described in connection with FIG. 1, the spindle holders or support arms 36 to 45 inclusive extend laterally into slots designated as 47, 48, 49 and 50. Actually, each of the slots is provided with a plurality of stationary pivot clamps and a coacting bridge clamp operating on the several spindle support holders associated therewith. To simplify the description, the hydraulic circuit, FIG. 5, is represented as being provided with a dotted line box 47H, and solid line boxes 48H, 49H and 50H respectively corresponding to the like numbered slots represented in FIG. 1. In a similar manner, the electrical control circuit, FIG. 6, is provided with a dotted line box 47E and solid line boxes 48E, 49E and 50E corresponding to the like numbered portions of the hydraulic circuit in FIG. 5, as well as the slots in FIG. 1.

Each of the spindles 34, 34A and 34B in FIG. 2, as well as the other tool spindles is adapted to support a cutting tool such as the drill 239 in FIG. 3. As there shown, the drill 239 is provided with a tang drive removably received in a toolholder 238. The toolholder 238 in turn is received within a bored opening 237 formed in a collet 243 which for simplicity, is represented as being integrally formed with the forward end of the tool spindle 34. The collet may be of the quick change type or may be provided with a threaded clamp ring (not shown). The arrangement is such that different sizes of drills may be carried by all of the tool spindles for drilling a predetermined pattern of holes according to the selected position of the spindles.

Referring now to FIG. 4, there are represented the hydraulic actuating cylinders 211, 144 and 212 for the stationary pivot clamps; and, the spaced apart actuating cylinders 193, 194 coacting with the bridge clamp operator 150. For descriptive purposes, it is deemed sufficient to described in detail the clamp control action effectuated by the above-enumerated cylinders, FIG. 4, in connection with the dotted line portion 47H of the hydraulic circuit, FIG. 5, and the dotted line portion 47E of the electrical control circuit, FIG. 6.

As shown in FIG. 5 a pump 247 driven by a motor 248 is connected to withdraw hydraulic fluid from a sump 249, transmitting it directly to a main pressure supply line 250. For maintaining uniform hydraulic pressure, it will be understood that a pressure regulating valve (not shown) is interconnected in line 250 in well known manner. The pressure supply line 250 is connected to supply fluid under pressure via branch lines 251, 252, 253 and 254 to solenoid actuated control valves 257 to 260 inclusive contained within the dotted line box 47H. Likewise, the pressure supply line 250 is connected via branch conduits 261, 262 and 263 to corresponding solenoid actuated valves (not shown) contained wtihin the solid line boxes 48H, 49H and 50H.

The flow of pressure fluid from the various control valves is exhausted via a main exhaust line 265 connected to return the hydraulic fluid to the sump 249. The main exhaust line 265 is connected to receive fluid from branch conduits 266 to 269, inclusive, respectively interconnected to ports in the solenoid actuated valves 257 to 260 inclusive. Whenever the machine is being operated with motor 248 energized to drive pressure supply pump 247, the various clamping mechanisms associated with the slot 47 are in clamped engagement in the event the solenoid actuated valves 257 to 260 are deactivated, as represented in FIG. 5. With this condition existing, the solenoids 277 to 280 inclusive associated with valves 257 to 260 inclusive are deenergized to permit resiliently biased leftward movement of the respective valve spools.

Thus, with solenoid 277 deenergized, pressure fluid from the main supply line 250 is transmitted via branch conduit 251 through a cannelure in the leftwardly urged valve spool 283 of valve 257 to a conduit 184. Admission of pressure fluid from conduit 284 into one end of cylinder 211 effects movement of piston 285 to permit movement of the associated piston rod 286 out of engagement with the Belleville spring 213. With the Belleville spring 213 in its resiliently expanded position, the axially movable pivot clamp element 203 is retained in clamped position, as shown in FIG. 4. At the same time, pressure fluid from the opposite end of cylinder 211, FIG. 5, is exhausted via a line 287 and a cannelure in the leftwardly biased valve spool 283 to the branch exhaust conduit 266 connected to the main exhaust line 265.

In a similar manner, with solenoid 278 of valve 258 deenergized, the valve spool 289 is resiliently urged to its leftward position as shown in FIG. 5 connecting branch pressure line 252 via a valve spool cannelure and a branch line 290. Hydraulic pressure fluid from branch line 290 flows into the leftward end of cylinder 144 urging the piston 291 rightwardly to effect corresponding rightward movement of piston rod 145. With this condition existing, the Belleville spring 141 is resiliently expanded to effect clamping operation of the associated pivot clamp element 123, FIG. 3. Pressure fluid from the rightward end of cylinder 144 is then exhausted via branch line 292 connected via the cannelure of a leftwardly moved valve spool 289 to branch line 267.

In like manner, with solenoids 279 and 280 of valves 259, 260 deenergized; the valve spools 293, 294 respectively associated therewith are resiliently urged to leftward position. With the valve spool 293 of valve 259 in leftward position, pressure fluid is transmitted to a branch line 295 causing rightward movement of piston 296 with the pressure fluid from the cylinder 212 being exhausted via line 297. Rightward movement of piston 296 effects corresponding rightward movement of piston rod 298 to permit the Belleville spring 214 to move to its clamping position.

In accordance with the description of the clamping operation of pivot clamp actuating springs 213, 141 and 214; it will be apparent that Belleville springs 182, 183 are resiliently expanded to actuate the bridge clamp operator 150 whenever solenoid 280 is deenergized and the valve spool 294 of valve 260 is resiliently biased to its leftward position. With this condition existing, hydraulic fluid under pressure is transmitted via branch conduit 300 to effect rightward movement of pistons 301, 302 effecting corresponding rightward movement of piston rods 191, 192. Pressure fluid from the rightward ends of cylinders 193, 194 is then exhausted via branch conduit 303 connected via a cannelure in the leftwardly biased valve spool 294 to the branch exhaust line 269.

For compressing one or another of the Belleville springs represented in the dotted line box 47H in FIG. 5, it will be apparent that one or another of the appropriate solenoids 277 to 280 inclusive is energized. Inasmuch as the unclamping operation is identical in all cases disengagement of only one of the spindle support arms will be described in detail. For example, to effect the desired lateral positioning movement of the spindle 34, FIGS. 2 and 3, it is necessary to release pivot clamp and bolt elements 128 and 129 for permitting lateral positioning movement of the spindle supporting arm 36. To accomplish this, it is necessary to activate both the single pivot clamp cylinder 144 and bridge clamp operator cylinders 193, 194 by energizing solenoids 278, 280 simultaneously to effect rightward movement of the associated valve spools 289, 294 respectively carried by valves 258, 260. Upon rightward movement of valve spool 289 in response to energization of solenoid 278, hydraulic fluid under pressure is transmitted to branch line 292, effecting leftward movement of piston 291 and piston rod 145, compressing the Belleville spring 141 to release the stationary pivot clamp element 128. Likewise, rightward movement of valve spool 294 in response to energization of solenoid 280, effects a transmission of fluid under pressure to the branch conduit 303 to effect leftward movement of pistons 301, 302 with a corresponding leftward movement of piston rods 191, 192 in a manner to urge the bridge clamp operator member 150 into unclamped position by simultaneously compressing Belleville springs 182, 183.

In a similar manner, Belleville springs 213, 214 can be actuated to released position in coordinated relationship with the actuation of Belleville springs 182, 183 of the bridge clamp operator 150 to permit the required lateral positioning movement of the associated spindle holders. Likewise, the various hydraulically actuatable clamp release mechanisms associated with branch circuits contained within solid line blocks 48H, 49H and 50H may be operated in a manner similar to the hydraulically actuated clamp release mechanism shown and described in detail with reference to the dotted line block 47H.

For controlling the various clamp actuating release mechanisms as well as the main driving motors, there is provided an electrical control circuit schematically illustrated in FIG. 6. As there shown, electrical energy from the usual three phase source is transmitted via a fused disconnect switch 307 to main supply lines L1, L2 and L3. The three phase lines L1, L2 and L3 are directly connectable to energize the feed drive motor 28, the spindle driving motor 54, and the pump drive motor 248. As hereinbefore explained with reference to FIG. 1, the feed drive motor 28 is connected to drive a variable speed feed transmission 29 which may be of any well known type including the usual selectively operable disconnect and reversing clutches (not shown). In like manner, as described in connection with FIGS. 1 and 3, the spindle drive motor 54 is connected to drive a shaft 117 connected to drive a variable speed transmission 55 which includes the usual disengageable clutch mechanisms. Whenever the machine is being operated, the pump drive motor 248 is energized to rotate, and likewise the feed motor 28 and spindle drive motor 54 are energized to rotate.

From the power supply lines L1, L2 and L3, power is transmitted to energize a transformer 308 which is connected to supply current of reduced voltage to lines 309, 310 for the machine control circuit. For simplicity in the description, the control circuit energized by input conductors 309, 310 is represented as being provided with a minimum number of control relays and is schematically shown to illustrate the mode of machine operation.

For energizing the control circuit to operate the machine, a master start button switch 312 is momentarily depressed, completing a circuit along horizontal line 2, via a normally closed stop button switch 313, to energize a relay coil 314. Energization of coil 314 effects closure of a normally open contact 314–3 interconnected in horizontal line 3 to complete a seal in circuit for retaining coil 314 energized. At the same time, another normally open contact 314–2 is moved to closed position completing a circuit from energized input conductor 310 to a vertical conductor 315. With vertical conductors 309, 315 both energized, the drive motors may be energized for operation by momentarily depressing push button switch 318, line 4. Upon momentarily depressing normally open switch 318, a circuit is completed along horizontal line 4, via a normally closed push button switch 319 to energize a relay coil 320, the latter effecting closure of a normally open contact 320–5 to complete a seal in circuit along horizontal line 5. For simplicity, separate motor starter relays are not shown in the schematic electrical circuit diagram in FIG. 6. Rather, energization of relay coil 320 is illustrated as effecting closure of normally open contacts 320–P for energizing the pump motor 248; closure of normally open contacts 320–F for energizing the feed drive motor 28; and, closure of normally open contact 320–S for energizing the spindle motor 54.

With these conditions established, the machine is ready for operation and the various clamp actuating solenoids 277 to 280 inclusive within that portion of the electrical circuit enclosed by the dotted line box 47E are deenergized. Likewise, similar clamp release solenoids (not shown) contained within solid line boxes 48E, 49E and 50E are deenergized. As hereinbefore explained, all of the spindle support arms 36 to 45 inclusive, FIG. 1, are in preselected clamped position relative to the spindle head structure 31.

From the vertical energized input line 309, a control circuit is completed via a normally closed push button switch 323 to energize a vertical conductor 324. From the energized vertical conductor 324, circuits are completed along the horizontal lines 6, 15 to supply current for activating the clamp release control circuit represented within the dotted line box 47E. At the same time, input circuits for activating clamp release circuits 48E, 49E, and 50E respectively are transmitted from the energized conductor 324 via horizontal lines 19, 20, horizontal lines 21, 22; and, horizontal lines 23, 24. From the energized vertical conductor 324, current is transmitted along horizontal line 6 via a normally closed push button switch 326 to energize a vertical branch conductor 327.

To energize clamp control solenoid 277, line 15, a normally open push button switch 329, line 7, is momentarily depressed. Momentary closure of switch 329 completes a circuit from energized conductor 327 along horizontal line 7 via a normally closed push button switch 328 to energize a relay coil 330, the opposite terminal of which is connected to energized vertical conductor 315. As this occurs, a normally open contact 330–8 is closed to complete a seal in circuit along lines 7 and 8; and a normally open contact 330–15 is closed to complete a circuit along horizontal line 15 to energize the clamp control solenoid 277.

Momentary closure of a switch 332 completes a circuit along line 9 via a normally closed push button switch 331 to energize coil 333, a normally open contact 333–10 being then closed to complete a holding circuit along line 10. At the same time, energization of coil 333 effects closure of normally open contact 333–16 to effect energization of clamp control solenoid 278. In a similar manner, closure of a normally open switch 336 completes a circuit along line 11 via normally closed switch 335 to energize coil 337, effecting simultaneous closure of a normally open seal in contact 337–12 and contact 337–17 to energize clamp control solenoid 279.

The bridge clamp control solenoid 280 is energized in response to momentary actuation of a push button switch 339 in line 13. As this occurs, a control circuit is completed from energized conductor 327 along horizontal line 13 via normally closed switch 338 to energize coil 340. The seal in circuit is completed upon closure of an associated normally open contact 340–14 and the clamp control circuit via a normally open contact 340–18 which is then closed to effect energization of bridge clamp control solenoid 280. With all of the solenoids 277 to 280 energized, the associated clamps are released to permit the required lateral positioning movement of the associated spindle holders 45, 36 and 47. To effect simultaneous reclamping of the spindle holders 45, 36 and 47 to the spindle head in selected laterally adjusted position, either the normally closed push button switch 323 or the normally closed push button switch 326 may be momentarily actuated. In either case, relay coils 330, 333, 337 and 340 are simultaneously deenergized to effect deenergization of the clamp control solenoids 277 to 280, inclusive. As this occurs, the control valves 257 to 260 inclusive, FIG. 5, are deactivated permitting resiliently biased movement of the associated valve spools to the positions represented in FIG. 5.

The clamp control circuits 48E, 49E and 50E in FIG. 6 are operable in identical fashion to effect unclamping or reclamping of the respectively associated spindle support arms.

Means are likewise provided to effect simultaneous energization of the clamp control solenoids 277 to 280, inclusive. To accomplish this, a normally open push button switch 343, line 6, is momentarily depressed to complete a circuit from energized vertical conductor 324 to energize a vertical conductor 344, the latter being interconnected to effect simultaneous energization of the control relay coils 330, 333, 337 and 340. Upon subsequent release of switch 343, seal in circuits for retaining the relays energized are completed upon closure of the associated normally open contacts represented in horizontal lines 8, 10, 12 and 14 as hereinbefore explained.

Whenever the electrical control circuit in FIG. 6 is so activated as to effect movement of all of the spindle holders to released or unclamped position, the various spindles associated therewith can be laterally repositioned by utilizing a template (not shown). After this, the spindles and spindle holders can be reclamped in preselected laterally adjusted position by momentarily depressing the push button switch 323, line 13, in FIG. 6. It will be apparent that momentary actuation of the normally closed switch 323 to open position effects a simultaneous deenergization of all of the clamp control valve solenoids permitting resiliently biased actuation of the respective Belleville springs for reclamping the spindle holders to the spindle head in selected position.

Although particular structures have been shown and described in considerable detail as exemplifying the manner in which the various embodiments of the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, we hereby claim as our invention:

1. In a multiple spindle drilling machine having a supporting frame, a plurality of spindle holders movably supported by said frame for lateral positioning movement, a plurality of tool spindles respectively journalled in said holders for rotation about axes perpendicular to the plane of lateral adjustment, a single selectively releasable clamp respectively associated with each of said spindle holders for releasably clamping the associated holder to said frame at one point, a plurality of releasable bridge clamps respectively operative to simultaneously clamp separate groups of said holders to said frame and each of said bridge clamps being located in laterally spaced relationship to said single clamps respectively associated with corresponding ones of said holders, and power operable control means respectively operative to selectively release said single clamps and said bridge clamps for effecting selective lateral positioning movement of said spindles and their associated holder.

2. In a machine tool, a frame, a work support and a spindle head carried for relative movement by said frame, a power drive operatively connected to effect relative rectilinear movement between said spindle head and said work support for performing a machining operation, said spindle head presenting a flat way surface perpendicular to the plane of relative rectilinear movement between said head and said work support, a plurality of spindle support arms releasably clamped to the way surface presented by said spindle head for selective lateral positioning movement, a tool spindle journalled in each of said support arms for rotation about an axis parallel to the plane of relative rectilinear movement between said spindle head and said work support, a power driven transmission connected to rotate each of said spindles irrespective of its laterally adjusted position, a plurality of individual power actuated clamp mechanisms and being respectively and selectively cooperable directly with said spindle support arms to releasably clamp said spindle support arms directly to said spindle head way surface in preselected laterally adjusted positions, a power actuated group clamp operative to simultaneously clamp said support arms to said way surface in spaced relationship to said individual clamp mechanisms, and control means connected to selectively actuate said individual power actuated clamp mechanisms and said group clamp for effecting lateral positioning movement of said spindle support arms and said associated spindles relative to said frame.

3. In a machine tool, a frame, a plurality of spindle holders movably supported by said frame and extending laterally therefrom, a clamping mechanism comprising an independent clamp directly cooperable with each of said holders for selective operation to clamp said associated holder directly to said frame and a group clamp simultaneously cooperable with said holders and being operative to releasably clamp said holders to said frame in a predetermined laterally adjusted position, a tool spindle rotatably journalled in each of said holders for lateral adjustment therewith, power drive means connected to rotate said spindles, and power operable means connected to release said clamping mechanism including said separate clamps and said group clamp selectively for effecting selective lateral positioning movement of said spindle holders for moving said spindles to preselected positions.

4. In a multiple spindle drilling head, a frame, a spindle head slidably carried by said frame for relative rectilinear movement, said spindle head being provided with a flat locating way surface and a guide slot perpendicular to the plane of relative movement of said head, a plurality of axially movable first pivot members secured to said head in fixedly spaced apart relationship to each other and the guide slot formed therein, a plurality of axially movable second pivot members guidably constrained in the guide slot in said head for lateral movement, all of said pivot members being provided with flanged outer ends and extending forwardly from said spindle head in perpendicular relationship to the flat locating way surface presented thereby, a plurality of spindle holders respectively provided with individual guide slots respectively and simultaneously engaging one of the first pivot members and corresponding one of the second pivot members, each associated first and second pivot members being adapted to engage a slot in one spindle holder in a manner to retain that associated holder in guiding engagement with the flat locating way surface presented by said spindle head, a power actuated clamp mechanism associated with each of said first pivot members, a common power actuated clamp mechanism associated with said laterally movable pivot members, power operable control means connected to selectively operate said clamp mechanisms for clamping said spindle holders against the locating way surface of said head in preselected positions of lateral adjustment, tool spindles journalled in said holders for rotation about axes parallel to the rectilinear plane of movement of said head, and means for driving said spindles irrespective of their laterally adjusted positions.

5. In a multiple spindle drilling machine having a supporting frame, a plurality of spindle holders movably supported by said frame for lateral positioning movement, a plurality of tool spindles rotatably journalled in said holders, a single selectively releasable clamp associated with each of said spindle holders for releasably clamping its holder directly to said frame at one point, releasable bridge clamps respectively operative to simultaneously clamp separate groups of said holders to said frame and being located in laterally spaced relationship to said single clamps respectively associated with corresponding ones of said holders, and means respectively operative to selectively release said single clamps and said bridge clamps for effecting selective lateral positioning movement of said spindles and their associated holders.

6. A multiple spindle drilling machine comprising a frame, a plurality of spindle holders, separate individual pivot means respectively adapted to guide said spindle holders for extensible and pivotable positioning movement relative to said frame, said pivot means respectively including individually releasable clamp means for selectively and individually clamping said associated holders directly to said frame in adjusted positions, tool spindles journalled in said holders for selective positioning movement therewith and a releasable clamp mechanism extending across said holders and cooperable therewith to simultaneously secure all of said holders to said frame in in adjusted position.

7. A multiple spindle drilling machine comprising a frame, a plurality of spindle holders, separate individual pivot means respectively adapted to guide said spindle holders for extensible and pivotable positioning movement relative to said frame, separate independently operable clamp means respectively associated with said pivot means for selective operation to clamp an associated one of said holders directly to said frame in adjusted position, tool spindles journalled in said holders for positioning movement therewith, a clamp mechanism spaced from said pivot means adapted to extend transversely across and be simultaneously cooperable with said holders for clamping said holders directly to said frame in adjusted position, and a plurality of power actuating means respectively disposed to selectively actuate said independent clamp means and said clamp mechanism.

References Cited in the file of this patent

UNITED STATES PATENTS

| | | |
|---|---|---|
| 558,497 | Kinney | Apr. 21, 1896 |
| 1,992,311 | Klausmeyer et al. | Feb. 26, 1935 |
| 2,356,796 | Purvin | Aug. 29, 1944 |
| 2,499,657 | Linderme | Mar. 7, 1950 |
| 2,608,112 | Speckin | Aug. 26, 1952 |
| 2,953,046 | Jones | Sept. 20, 1960 |
| 3,036,479 | Aquillon et al. | May 29, 1962 |